United States Patent [19]

Davis et al.

[11] 4,414,623
[45] Nov. 8, 1983

[54] DUAL DEADMAN TIMER CIRCUIT

[75] Inventors: Walter L. Davis, Plantation; James E. Jacobson, Jr., Ft. Lauderdale, both of Fla.

[73] Assignee: Motorola, Inc., Schaumburg, Ill.

[21] Appl. No.: 192,772

[22] Filed: Oct. 1, 1980

[51] Int. Cl.³ .............................................. G06F 1/04
[52] U.S. Cl. ................................. 364/200; 364/900
[58] Field of Search ... 364/200 MS File, 900 MS File, 364/707; 371/62, 17

[56] References Cited

U.S. PATENT DOCUMENTS

| | | | |
|---|---|---|---|
| 3,191,153 | 6/1965 | Bratschi et al. | 371/62 |
| 3,267,381 | 8/1966 | Thornberg et al. | 377/114 |
| 3,564,426 | 2/1971 | Anderson et al. | 377/109 |
| 3,626,372 | 12/1971 | Chayt | 340/825.26 |
| 3,641,328 | 2/1972 | Osborne | 364/707 |
| 3,719,890 | 3/1973 | Borcianni | 375/7 |
| 3,745,529 | 7/1973 | Engle | 371/62 |
| 3,865,981 | 2/1975 | Welch et al. | 375/108 |
| 3,893,617 | 7/1975 | Solberg | 371/62 |
| 3,909,795 | 9/1975 | Chang et al. | 364/200 |
| 3,955,185 | 5/1976 | Nishimura | 364/707 |
| 4,025,768 | 5/1977 | Missios et al. | 364/200 |
| 4,040,022 | 8/1977 | Takii | 364/900 |
| 4,072,852 | 2/1978 | Hogan et al. | 364/900 |
| 4,122,996 | 10/1978 | Wilczek | 364/900 |
| 4,131,945 | 12/1978 | Richardson et al. | 364/200 |
| 4,204,249 | 5/1980 | Dye et al. | 364/200 |
| 4,259,594 | 3/1981 | Fox et al. | 364/707 |
| 4,317,180 | 2/1982 | Lies | 364/707 |

FOREIGN PATENT DOCUMENTS

| | | | |
|---|---|---|---|
| 2747384 | 4/1978 | Fed. Rep. of Germany | 371/62 |
| 54-18250 | 2/1979 | Japan | 371/62 |

OTHER PUBLICATIONS

Digital Design; vol. 8, No. 4, Apr. 1978, p. 72, "Improved UC Watchdog Timer Detects Errors".

Primary Examiner—Mark E. Nusbaum
Assistant Examiner—William G. Niessen
Attorney, Agent, or Firm—Joseph T. Downey; Edward M. Roney; James W. Gillman

[57] ABSTRACT

A dual deadman timer circuit functions to reset a dual mode microprocessor in the event of loss of program control. The microprocessor has high and low power requirements corresponding to its two operating modes, and the deadman timer circuit also adjusts the output power level of an associated two-level power supply to ensure that sufficient power is available for the full operation of the microprocessor during reset. The deadman timer functions during both microprocessor modes and includes two level-sensitive input sections to ensure that the microprocessor is reset under an error condition.

10 Claims, 3 Drawing Figures

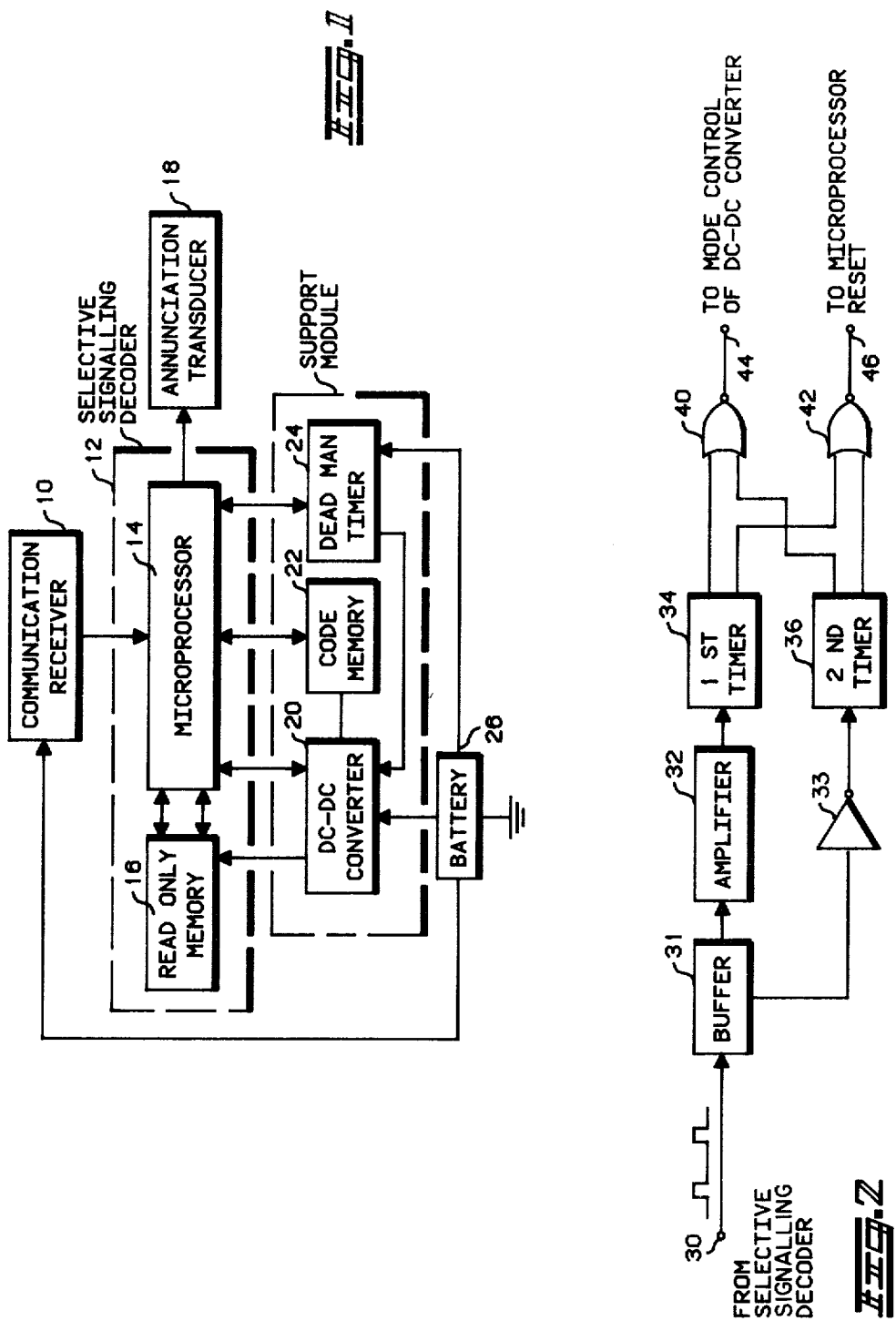

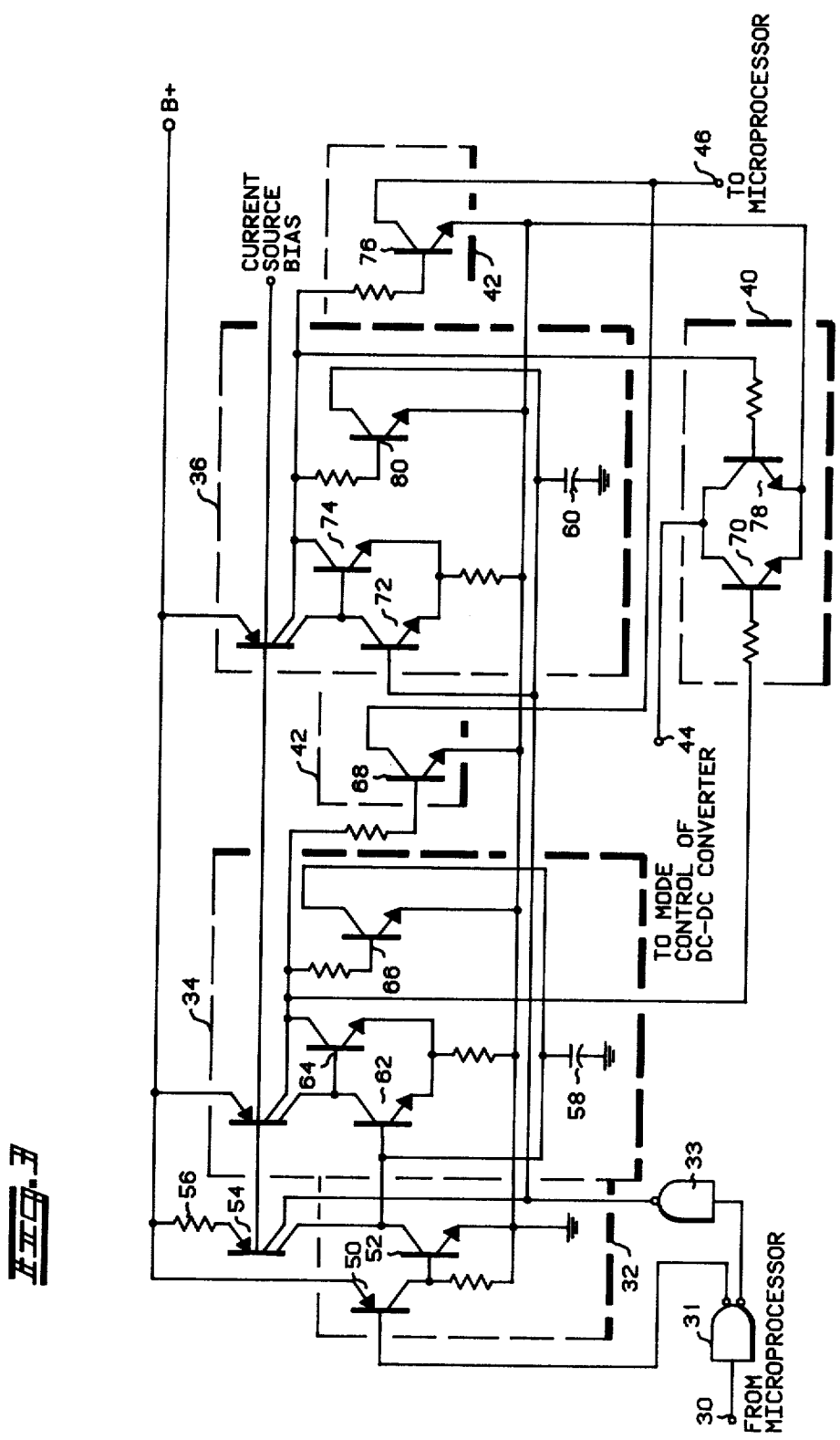

DUAL DEADMAN TIMER CIRCUIT

BACKGROUND OF THE INVENTION

This invention relates to the field of error prevention in microprocessor-related circuits and, more particularly, to an error prevention device which controls the microprocessor power supply as well as resetting the microprocessor.

Many so-called "deadman" timer circuits are known in the field of electronics equipment. Generally, they operate on a clock or reset signal which must be received at regular intervals. If the clock or reset signal is not received at the appropriate time, the deadman timer either switches in an alternate piece of equipment or activates some form of failure indicator. In the case of a device which includes a microprocessor, neither of these responses is satisfactory, especially since "failure" is generally not an equipment failure as such, but rather a failure mode in the microprocessor operation. Such a failure mode could be caused by noise or other spurious signal causing the microprocessor to follow the wrong instruction, provide a wrong output signal or to get caught in a loop of the program. It would be desirable to reset the microprocessor to reinitiate the program when such an error has occurred.

The problem of resetting a microprocessor in the event of a program failure mode becomes more difficult in the environment of the present invention. Here the microprocessor is contained in a battery powered device where, in order to conserve power, the microprocessor is operated in two modes: a first high drain, fully operational mode; and a second reduced drain, reduced operational capability mode. To further minimize power drain, the microprocessor's power supply also has two operational modes that correspond to the two power demand modes of the microprocessor. Thus, in order to reinitialize the operation of the microprocessor, it is necessary to switch the power supply to the full output mode as well as to reset the microprocessor. It is also a requirement that such a deadman timer circuit operate in the reduced operational capability mode of the microprocessor.

SUMMARY OF THE INVENTION

It is therefore an object of the present invention to provide a deadman timer for a circuit including a microprocessor which will reset the microprocessor if the microprocessor should lose program control.

It is another object of the present invention to provide a deadman timer to control the power supply for the microprocessor to ensure the availability of sufficient power for reinitialization.

It is still another object to have the deadman timer capable of operating in both the reduced operational capability and fully operational modes of the microprocessor.

These and other objects which will become apparent are obtained in a device having a dual input level timer which, under normal conditions, receives regularly timed pulses from a microprocessor. If the pulses stop due to any problem in the microprocessor operation, the timer will actuate a reset of the microprocessor to reinitialize the program regardless of the level of the timed pulses from the microprocessor. The device also includes a two-level power supply and the deadman timer provides a signal which will at the same time actuate the full power mode of the power supply to ensure that the microprocessor is supplied with the power required for full operation.

BRIEF DESCRIPTION OF THE DRAWINGS

FIG. 1 is a block diagram illustrating the use of the invention in a paging receiver or other communication receiver.

FIG. 2 is a block diagram illustrating the circuit of the invention.

FIG. 3 is a schematic diagram of the circuit of the invention.

DETAILED DESCRIPTION OF THE PREFERRED EMBODIMENT

The present invention has particular application to a miniature electronic device, such as a personal pager, operating with a small battery cell and including a microprocessor for decoding communication signals. FIG. 1 shows a functional diagram of such a paging receiver utilizing the present invention. Specifically, a communications receiver 10 is connected to a selective signalling decoder 12 that comprises a microprocessor 14 and a read-only memory 16. The decoder 12 is further interconnected with an annunciation transducer 18, a DC/DC converter 20, a code memory 22 and a deadman timer 24.

The receiver 10, the DC/DC converter 20, and the deadman timer 24 are directly connected to a battery 26, which powers the operation of these blocks and is the energy source for the DC/DC converter 20. Converter 20 generates the power supply levels needed to operate the selective signal decoder 12 and the code memory 22.

In operation, the communications receiver 10 recovers signals transmitted over some communications channel and supplies that signal to the decoder 12 containing microprocessor 14. The decoder 12 in turn functions to decode the recovered signal by determining if it contains any of the one or more address signal patterns stored in code memory 22. If a pattern match is detected, the decoder 12 activates the annunciation transducer 18 and causes an appropriate alert signal to be generated to inform the user that a paging signal has been received.

In order to minimize the drain from battery 26, the decoder 12 is operated in two modes, a high power drain, fully operational mode in which it can decode signals in real time, and a reduced power drain, reduced operational capability mode in which the decoder times the interval to the next transition to the high power drain mode. To take full advantage of the power saving, dual mode operation of the decoder, the DC/DC converter power supply 20 also has two operational modes that correspond to the two modes of the decoder. That is, the converter 20 has a high output mode in which it can supply the power required to operate the decoder in its high drain, fully operational mode, and a reduced output mode in which it can supply the power required to operate the decoder in its low drain, reduced operational capability mode.

Thus, in its low output mode, the DC/DC converter 20 is adjusted to supply a greatly diminished output power level with maximum efficiency. And, as a result, the converter cannot support the fully operational high drain mode of the decoder.

During the normal operation of the system, the microprocessor 14 controls the operation of the DC/DC converter 20 and switches the output mode of the converter in accordance with its power demands. A control output from the deadman timer 24 is also connected to the converter 20, and this signal path will place the converter 20 in the high output mode if the microprocessor should experience a program execution failure and require reinitialization.

The present invention is shown in more detail in FIG. 2, where a terminal 30 is an input terminal which couples a timed pulse signal from a selective signal decoder (not shown) into a buffer circuit 31. These signals will be two-level waveforms (as shown) comprising very brief pulses. The cessation of these pulses will indicate that something has disrupted the normal operation of the microprocessor. The output of buffer 31 is separately connected through an amplifier 32 to a first timer 34 and through an inverter 33 to a second timer 36. The received pulses are therefore separately coupled to the timing circuits 34 and 36. Timer 34 therefore detects a first error state of the microprocessor operation. Timer 34 includes means for detecting a missing pulse and, since the pulse duration is very short, amplifier 32 precedes the timer 34 to raise the level of the signals as will be further explained hereinbelow. Timer 36 includes means for detecting that the input at terminal 30 has been high for too long a period, by utilizing the output of inverter 33 which is coupled between buffer 31 and timer 36. Timer 36 serves to detect a pulse that does not end at the correct time, thus indicating that the microprocessor "failed" during a timed pulse signal. Timer 36 therefore detects a second error state of the microprocessor operation. The outputs of first timer 34 are connected to the first inputs of a NOR gate 40 and to a NOR gate 42. The outputs of second timer 36 are connected to the second input of NOR 40 and to the second input of NOR 42.

The output of NOR 40 is coupled via a terminal 44 to the mode control input of a DC/DC converter (not shown) which supplies current to the device at either a "standby" or a "fully-powered" level. Detection of either of the error states just described will cause the DC/DC converter 20 to switch to the full current output mode. The output of NOR 42 is coupled via a terminal 46 to reset and initialize the microprocessor, causing the microprocessor to go back to the starting point of the program, regardless of where the error occurs in the program.

A preferred embodiment of the circuit for the present invention is shown in FIG. 3. The buffer 31 inverts the incoming pulses supplied from the microprocessor at terminal 30 and provides separate buffered outputs to inverter 33 and amplifier 32 which includes transistors 50 and 52. A current source comprised of a transistor 54 and a resistor 56 supplies current to charge capacitors 58 and 60 in the timers 34 and 36 respectively. With the capacitor 58 discharged, a transistor 62 in the timer 34 will be non-conducting and a transistor 64 will be conducting. The capacitor 58 will begin to charge linearly and continue until a high logic level pulse is received at the terminal 30, causing the discharge of the capacitor. However, if a high logic level pulse should not be received, indicating an operational problem in the microprocessor, the capacitor 58 will continue charging until the transistor 62 begins to conduct. At this point transistor 62 in conductance cuts off the transistor 64 and sends a signal from the collector of the transistor 64 to each of the NOR gates 40 and 42 shown in electrical schematic form. NOR 42 is shown in two portions on either side of timer 36. The signal is supplied specifically to transistors 70 and 68 respectively.

As described before, an output signal from the NOR 40 ensures that the microprocessor is fully powered by the DC to DC converter 20 in its high power mode and an output signal from the NOR 42 resets the microprocessor, reinitializing the program. A transistor 66, also coupled to the collector of transistor 64, provides a feedback signal which discharges the capacitor 58 and turns off the transistor 62, resetting the timer 34. Since the discharge of the capacitor 58 is enabled only by the brief input pulse, the buffer amplifier 32 boosts the level of the pulse to ensure proper operation. The process of charging and discharging the capacitor 58 will then continue until another input pulse is again missed for some reason.

In timer 36, the operation is essentially as in the timer 34. The input, however, is inverted, and capacitor 60 is charged during high logic level pulses and discharged between pulses. In other words, the capacitor charges on a high level signal and discharges at a low signal. Thus, if the microprocessor program operation should fail or false during a timed pulse from the microprocessor to the deadman timer, capacitor 60 would continue charging. A transistor 72 in the timer 36 will begin to conduct, a transistor 74 will be turned off, sending a signal to transistors 76, 78 and 80 of the NOR gates 42 and 40, respectively. NOR gates 40 and 42 will then produce signals to change to the high current mode of the DC to DC converter and reset the microprocessor. A transistor 80, also coupled to the collector of the transistor 74, discharges the capacitor 60 and turns off the transistor 72. The charging and discharging cycle of capacitor 60 will then continue as before in the timer 36 as long as the input pulses at the input terminal 30 continue normally.

Thus, there has been shown and described a dual deadman timer which operates to reinitialize a microprocessor in the event of a software failure in the microprocessor, and also ensures that the microprocessor is fully powered for reinitialization. Other variations and modifications are possible and it is intended to cover all such as fall within the spirit and scope of the appended claims.

What is claimed is:

1. In a device including a microprocessor having means to generate signal pulses indicative of proper function and a multi-mode power supply supplying power to the microprocessor, a deadman timer comprising:

input means for receiving signal pulses from the microprocesssor indicative that the microprocessor is functioning properly;

first timing means coupled to the input means for determining if the signal pulses have been interrupted;

second timing means coupled to the input means for determining if a pulse persists for a predetermined time interval;

first output means coupled to said first and second timing means for providing a reset pulse to the microprocessor in response to either an interruption in the signal pulses or a pulse having an improper pulse width interval for reinitializing the operation of the microprocessor;

second output means coupled to said first and second timing means for switching the multi-mode power supply to a high output mode in response to either said interruption in signal pulses or improper pulse width interval thereby insuring that the multi-mode power supply can provide the power required to reinitialize the microprocessor.

2. The deadman timer of claim 1 wherein the power supply has two output modes.

3. The deadman timer of claim 2 wherein the power supply is a DC/DC converter.

4. In a device including a microprocessor having means to generate signal pulses indicative of proper function and a multi-mode power supply supplying power to the microprocessor, a deadman timer comprising:

input means for receiving signal pulses from the microprocessor indicative that the microprocessor is functioning properly;

first timing means coupled to said input means for determining from a first logic level of the received signal pulses, that the signal pulses have been interrupted, said first timing means being responsive to the duration of a first logic level of the signal pulses and producing a first interruption signal whenever said first logic level persists for more than a first predetermined time interval;

second timing means coupled to said input means for determining from a second logic level of the signal pulses, that the signal pulses have been interrupted, said timing means being responsive to the duration of said second logic level of the signal pulses and producing a second interruption signal whenever said second logic level persists for more than a second predetermined time interval;

first output means coupled to said first and second timing means for providing a reset pulse to the microprocessor in response to either of said first or second interruption signals to reinitialize the operation of the microprocessor; and second output means coupled to said first and second timing means for switching the power supply to a high output mode in response to either of said first or second interruption signals to insure that the power supply can provide the power required to reinitialize the microprocessor.

5. The device in claim 4 in which the power supply has two output modes.

6. The device in claim 5 in which the power supply is a DC/DC converter.

7. In a device including a microprocessor having means to generate signal pulses indicative of proper function and a multi-mode current supply coupled to and supplying power to the microprocessor, a dual deadman timer comprising:

input means for receiving signal pulses from the microprocessor indicative that the microprocessor is functioning properly;

a first timing means coupled to the input means for timing a first level duration of each of the input pulses, and for supplying an output signal in response to a first level duration greater than a first predetermined period;

a second timing means coupled to the input means for timing a second level duration of each of the input pulses, and for supplying a second output signal in response to a second level duration greater than a second predetermined period;

first output means coupled to the first and second timing means for providing a reinitializing pulse to the microprocessor in response to an output signal from either one of the timing means; and second output means coupled to the first and second timing means for switching the power supply to a high output mode in response to an output signal from either one of the timing means.

8. In a device according to claim 7 wherein the input means includes inverter means for inverting the received signal and the inverted signal is coupled to the second timing means.

9. In a device according to claim 8 wherein the first and second output means include NOR gates.

10. In a device according to claim 9 wherein an amplifier stage is coupled to the input of the timing means having the longer of the two predetermined periods.

* * * * *